United States Patent [19]

Morita et al.

[11] 3,989,796

[45] Nov. 2, 1976

[54] METHOD FOR REMOVING SULFUR DIOXIDE IN THE FORM OF CALCIUM SULFITE FROM COMBUSTION EXHAUST GAS

[75] Inventors: Tomijiro Morita; Isao Funahashi; Koichi Igarashi; Masakazu Takaiwa, all of Iwaki, Japan

[73] Assignee: Kureha Kagaku Kogyo Kabushiki Kaisha, Tokyo, Japan

[22] Filed: Sept. 18, 1973

[21] Appl. No.: 398,426

[30] Foreign Application Priority Data

Sept. 19, 1972 Japan................................ 47-93933

[52] U.S. Cl............................... 423/242; 423/512 A
[51] Int. Cl.²......................................... C01B 17/00
[58] Field of Search ........... 423/242, 512, 244, 166, 423/555

[56] References Cited
UNITED STATES PATENTS

| | | | |
|---|---|---|---|
| 3,775,532 | 11/1973 | Shah................................... | 423/242 |
| 3,794,714 | 2/1974 | Atsukawa et al................... | 423/242 |
| 3,848,070 | 11/1974 | Omozuka et al.................... | 423/512 |

*Primary Examiner*—Oscar R. Vertiz
*Assistant Examiner*—Gregory A. Heller

[57] ABSTRACT

There is disclosed a method wherein sulfur dioxide contained in combustion exhaust gas is absorbed in an aqueous alkali sulfite solution to produce a corresponding alkali bisulfite and the resultant aqueous alkali bisulfite solution is added with calcium carbonate to form calcium sulfite, the method comprising wet-powdering the calcium carbonate into a particle size within a range of 0.1 – 30 $\mu$ in a slurry form by the use of a part of a filtrate which is obtained by separating calcium sulfite from the reaction solution, and reusing the remainder of the filtrate as an aqueous alkali sulfite solution for absorbing sulfur dioxide, whereby substantially no waste water is discharged out of the reaction system and sulfur dioxide can be recovered in the form of highly pure calcium sulfite.

7 Claims, 1 Drawing Figure

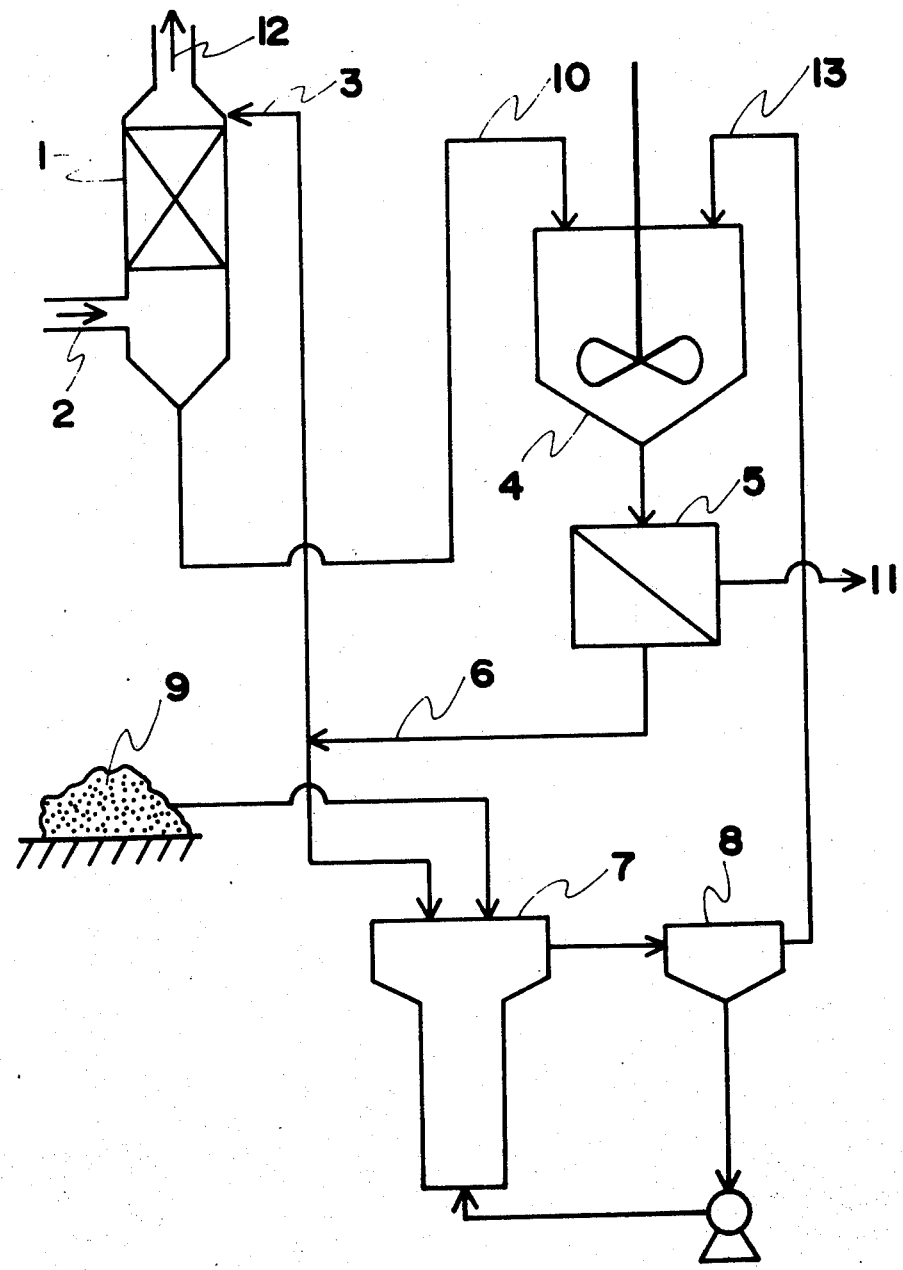

METHOD FOR REMOVING SULFUR DIOXIDE IN THE FORM OF CALCIUM SULFITE FROM COMBUSTION EXHAUST GAS

This invention relates to a method for removing sulfur dioxide from combustion exhaust gas, by converting it to calcium sulfite, and more particularly to improvements in a method for removing sulfur dioxide contained in the exhaust gas by introducing the exhaust gas into an aqueous alkali sulfite solution for reaction, and adding calcium carbonate to the reaction solution thereby converting the sulfur dioxide to calcium sulfite.

BACKGROUND OF THE INVENTION

Various methods for removing sulfur dioxide from a combustion exhaust gas have been heretofore proposed, including a dry method using a variety of adsorbents and a wet method using aqueous alkali sulfite solution. In the wet method, an exhaust gas is introduced into an aqueous alkali sulfite solution for reacting sulfur dioxide contained in the aqueous exhaust gas with the alkali sulfite to obtain the alkali bisulfite solution, to which calcium carbonate is added for forming calcium sulfite, thus sulfur dioxide being removed in the form of calcium sulfite. The reaction mechanism in the method can be expressed by the following reactions (1) and (2) where sodium sulfite is used as an alkali sulfite:

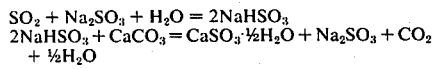

$$SO_2 + Na_2SO_3 + H_2O = 2NaHSO_3 \quad 1.$$
$$2NaHSO_3 + CaCO_3 = CaSO_3 \cdot \tfrac{1}{2}H_2O + Na_2SO_3 + CO_2 + \tfrac{1}{2}H_2O \quad 2.$$

However, the wet method employing an aqueous alkali sulfite solution in removing sulfur dioxide from the exhaust gas has many disadvantages in that a large amount of calcium carbonate is required for conducting the above reaction (2). Calcium carbonate is hardly soluble in water so that, when it is added to the aqueous alkali bisulfite solution for the reaction expressed by the formula (2), the solid-liquid reaction takes place with only extremely low reactivity, with the result that unreacted calcium carbonate remains in the reaction system in a large amount. Moreover, since the produced calcium sulfite is also almost insoluble in water, the calcium sulfite is undesirably mixed with the above-mentioned unreacted calcium carbonate, making it difficult to recover calcium sulfite in a highly pure form.

SUMMARY OF THE INVENTION

It is therefore highly desired in the wet method to reduce the amount of unreacted calcium carbonate contained in the calcium sulfite producing system as well as to recover the produced calcium sulfite in high purity, thus reducing the required amount of calcium carbonate to a significant degree.

It is a main object of the present invention to provide an improved wet method for removing sulfur dioxide from combustion exhaust gas by converting same to calcium sulfite. Other objects and advantages and features of the present invention will become apparent from the following description.

According to the present invention, there is provided a method wherein an aqueous exhaust gas containing sulfur dioxide is introduced into an alkali sulfite solution for reaction and the resultant alkali bisulfite solution is added with calcium carbonate to form calcium sulfite, the method comprising powdering calcium carbonate into a particle size within a range of $0.1 - 30\ \mu$ in a wet state by the use of a part of a filtrate of the reaction system and adding the resultant calcium carbonate in the form of a slurry to the aqueous alkali bisulfite solution for effectively carrying out the reaction of the alkali bisulfite and calcium carbonate and significantly reducing the amount of unreacted calcium carbonate which would otherwise remain in the calcium sulfite-producing system in a large amount. As a result, highly pure calcium sulfite can be recovered. In addition, a part of a filtrate of the reaction system free from the calcium sulfite product is utilized for wet-powdering of calcium carbonate as mentioned hereinbefore, while the remaining part is re-circulated as an aqueous alkali sulfite solution for absorbing sulfur dioxide.

According to the method of the present invention, in a sulfur dioxide removing method wherein combustion exhaust gas containing sulfur dioxide is introduced into the alkali sulfite aqueous solution for reacting the aqueous sulfur dioxide with the alkali sulfite and then the resultant aqueous alkali sulfite solution is added with calcium carbonate to form calcium sulfite, a part of a filtrate obtained by separating the produced calcium sulfite from the reaction solution is employed for powdering calcium carbonate in a wet state into a particle size within a range of $0.1 - 30\ \mu$. The resultant calcium carbonate slurry is added to the aqueous alkali bisulfite solution for efficiently carrying out the double decomposition reaction of the alkali bisulfite and calcium carbonate. That is, the calcium carbonate particles take part in the reaction in their entirety rather than surfacewise, so that almost no unreacted calcium carbonate remains in the reaction system, (i.e., it is possible to obtain calcium sulfite of a purity higher than 95%). The remaining part of the filtrate obtained by separation of calcium sulfite from the reaction solution can be re-circulated for the reaction with the exhaust gas, i.e., sulfur dioxide contained in the exhaust gas is interacted with the alkali sulfite to form an aqueous alkali bisulfite solution. Thus, the water balance within the reaction system can be maintained without supplementing fresh water from outside the reaction system, it being possible to conduct the reaction in a closed system.

BRIEF DESCRIPTION OF THE DRAWING

The FIGURE is a flow chart showing a preferred embodiment of the present invention. In the FIGURE, designated at 1 is combustion exhaust gas-absorbing tower; at 2 a tube for feeding combustion exhaust gas to the absorbing tower 1; at 3 a tube for feeding an aqueous alkali sulfite solution to the absorbing tower 1; at 4 a double decomposition reacting vessel; at 10 a tube for feeding to the reacting vessel 4 an aqueous alkali bisulfite solution which is produced in the absorbing tower 1; at 9 a calcium carbonate reservoir; at 7 a wet type calcium carbonate powdering machine; at 8 a classifier; at 13 a tube for feeding to the reacting vessel 4 calcium carbonate in the form of a slurry, which is produced in the powdering machine 7 and the classifier 8; and at 5 a filter and separator of the reaction product formed in the double decomposition reacting vessel 4. Furthermore, indicated at 11 is a tube for recovering calcium sulfite produced; at 12 an exhaust gas which has been rendered harmless by removal therefrom of sulfur dioxide; and at 6 a tube for recirculating to the absorbing tower 1 a filtrate, which is obtained by separating calcium sulfite from the reaction solution, as an aqueous alkali sulfite solution.

DETAILED DESCRIPTION OF THE INVENTION

As described hereinbefore, it is well-known that, when calcium carbonate is added to an aqueous alkali bisulfite solution which is obtained by introducing a combustion exhaust gas containing therein sulfur dioxide into an aqueous alkali sulfite solution, a large quantity of calcium carbonate is left unreacted in the reaction system due to extremely low solubility of calcium carbonate in an aqueous solution. Particularly, when the pH value of the aqueous alkali bisulfite solution is within a range of 5.5 – 7.0, almost no calcium carbonate is dissolved in the solution, i.e., the solubility is as low as several tens ppm. Accordingly, the use of an extremely small particle size of calcium carbonate is considered effective for increasing its reaction areas, for reducing the residual amount of unreacted calcium carbonate.

However, commercially and inexpensively available calcium carbonate for industrial use includes limestone, chalk, calcite, aragonite, coral, shell and the like, and the particle size of these calcium carbonates in the form of granular or powder is generally as large as 70 $\mu$ – 10 mm. If the commercial calcium carbonate is employed, there is presented a problem in that a large amount of calcium carbonate remains unreacted as described hereinbefore. Therefore, it is usually required to finely powder the commercial calcium carbonate. However, the dry process requires a greater powdering power as compared with a wet process and thus results in higher production costs. Moreover, the dry process disadvantageously involves undesirable problems such as dust or noise. On the other hand, where a slurry, prepared outside the reaction system by adding water to the calcium carbonate, i.e., by a wet process, is introduced into the reaction system, water balance in the entire reaction system is lost as described hereinafter.

In order to overcome the aforementioned disadvantages, calcium carbonate particles are finely powdered in the present invention by first mixing calcium carbonate with a part of a filtrate of the reaction solution from which calcium sulfite has been separated and then powdering the calcium carbonate in a wet state by means of, for example, a grinding type wet powdering machine to form, in a slurry form, powdered calcium carbonate having a particle size within a range of 0.1 – 30 $\mu$, preferably within a range of 0.1 – 20 $\mu$. With such a small size, calcium carbonate contained in the slurry tends to readily react with the alkali bisulfite to form calcium sulfite and almost all calcium carbonate in the slurry is consumed. The filtrate which is the aqueous alkali sulfite solution can also be re-used for absorbing sulfur dioxide contained in the combustion exhaust gas.

As is apparent from the foregoing, the filtrate produced after the separation of calcium sulfite from the double decomposition reaction solution is used both for wet-powdering calcium carbonate and for absorbing sulfur dioxide in the combustion exhaust gas so that no water is discharged from the reaction system and water balance within the system can be maintained constant. When calcium sulfite is separated from the reaction system, however, a small amount of water and alkaline component is carried away from the system by the separated calcium sulfite. In this case, a compensating amount of water and alkaline component may be supplied to the system, if necessary. This is apparently advantageous as compared with the aforementioned method where calcium carbonate is mixed with water outside the reaction system to obtain by wet-powdering a slurry for introduction to the reaction system, since no unnecessary water is required to be charged into the reaction system to disturb the water balance within the system. Otherwise, in order to maintain the water balance at a suitable level, it is not necessary to remove surplus water from the system by complicated operations.

As described hereinbefore, where the pH value of the aqueous alkali bisulfite solution is within a range of 5.5 – 7.0, the solubility of calcium carbonate in the solution becomes very low. In general, however, in the wet process employing the aqueous alkali sulfite solution, the aqueous alkali bisulfite solution having a pH value of 5.5 – 7.0 is considered preferable in practical use. The reasons for this are as follows:

1. the absorption efficiency of sulfur dioxide is remarkably reduced if sulfur dioxide in combustion exhaust gas is forcibly absorbed in the aqueous alkali sulfite solution forming an aqueous alkali bisulfite solution having a pH value smaller than 5.5; and 2. where calcium carbonate is added to the aqueous alkali bisulfite solution with a pH value greater than 7.0, carbon dioxide is secondarily produced and the carbon dioxide is reacted with the alkali sulfite which is contained in the reaction solution. Accordingly, an unnecessary amount of the alkali sulfite is consumed. In accordance with the method of the present invention, however, calcium carbonate is finely powdered, so that the carbonate can be suitably reacted with the alkali bisulfite even if the pH value of the aqueous alkali bisulfite solution is within such an unfavorable range where calcium carbonate shows low solubility. In the double decomposition reaction of the present invention, the pH value of the aqueous alkali bisulfite solution is maintained within a range of 5.5 – 7.0. For this, when sulfur dioxide contained in the combustion exhaust gas is introduced into a 10 – 25% aqueous alkali sulfite solution, the absorption condition of sulfur dioxide should be controlled in such a manner that the alkali bisulfite produced is contained in the aqueous alkali bisulfite solution in an amount 3 – 15 wt%.

In general, the particle size of calcium carbonate imposes great influences on the reaction rate velocity and yield. In this instance, where the particle size is about 74 $\mu$, about 20% of calcium carbonate is left unreacted. While, where the size is within a range of 0.1 – 30 $\mu$, preferably within a range of 0.1 – 20 $\mu$, it is possible to reduce unreacted calcium carbonate to an amount less than 5%.

An example of the present invention will be described in the following.

The combustion exhaust gas which contains sulfur dioxide is fed into the absorbing tower 1 from the bottom thereof through the tube 2. While, 10 – 25% aqueous alkali sulfite solution is flowed down from the top of the tower 1 through the tube 3 and is brought into countercurrent contact with the exhaust gas for absorbing the sulfur dioxide in the solution. The resultant exhaust gas is thus rendered harmless and is released into the air from the top of the tower 1. The aqueous alkali bisulfite aqueous solution which is produced by the reaction of the sulfur dioxide and the alkali sulfite in the tower 1 has a temperature of 50°– 70° C and contains 3 – 15% of the alkali bisulfite. The alkali bisulfite solution is charged from the bottom of the tower 1 and fed to the double decomposition reaction vessel 4. On the other hand, commercial calcium carbonate having a particle size of 10 mm to 70 $\mu$ is fed from the calcium carbonate reservoir 9 into the wet type powdering machine 7 to which a part of the above-mentioned aqueous alkali sulfite solution is also fed. In the wet type powdering machine 7 and classifier 8, the calcium carbonate is reduced to a particle size within a range of 0.1 – 30 82, preferably within a range of 0.1 – 20 $\mu$, to form a slurry, which is then sent to the double decomposition reaction vessel 4. In the vessel 4, the aqueous alkali bisulfite solution fed through the tube 10 is mixed with the slurry, the alkali bisulfite and calcium carbonate being reacted with each other. The resultant reaction solution is introduced into the filter and separator 5 to separate the produced calcium sulfite from the reaction solution. The thus separated calcium sulfite is sampled from the sampling tube 11 and is subjected to a purity test. The test revealed that the purity of the calcium sulfite is higher than 95%. On the other hand, a major portion of the resultant filtrate, which has a pH value within a range of 6.5 – 8.5, and contains 10 – 25% by weight of alkali sulfite and substantially 0 – 8% by weight of alkali bisulfite, is recirculated through the tubes 6 and 3 to the absorbing tower 1, and a minor portion is fed to the wet type powdering machine 7 through a tube branched from the tube 6. Thus, almost no water is discharged outside the system, so that water balance within the system can be maintained at a constant level.

The wet type powdering machine 7 may be of any type which can powder calcium carbonate into a particle size within a range of 0.1 – 30 $\mu$. Particularly, a hydraulic elutriation apparatus which has a classifying mechanism as shown in the attached drawing is preferred.

In accordance with the present invention, sulfur dioxide contained in the combustion exhaust gas can be effectively removed in the form of calcium sulfite with an increased calcium sulfite-forming rate velocity and purity of the ultimately produced calcium sulfite. Furthermore, almost no water is discharged out of the system and no problems such as environmental pollution arises in any way whatsoever.

Additionally, the use of highly pure calcium sulfite can contribute to reduction in the amount of sulfuric acid which is used at a stage of removing a by-produced alkali sulfate. That is, when sulfur dioxide contained in the combustion exhaust gas is introduced into the aqueous alkali sulfite solution, the alkali sulfate is secondarily produced together with the main product of the alkali bisulfite and accumulated in the reaction system. Since the existence of a large amount of the alkali sulfate in the system reduces the absorptivity of sulfur dioxide, it is essentially required to remove the accumulated sulfate. In order to remove the alkali sulfate, sulfuric acid and calcium sulfite may be added to the aqueous alkali bisulfite solution discharged from the tower 1. However, in prior-art processes, the produced calcium sulfite has low purity, so that it can not be suitably added to the aqueous alkali bisulfite solution without entailing consumption of an excess of sulfuric acid. In contrast to the prior-art processes, the method of the present invention can yield highly pure calcium sulfite and the charging amount of sulfuric acid can be reduced to a substantial degree.

The present invention will be more particularly illustrated in the following example which is shown by way of illustration.

EXAMPLE

An exhaust gas 2 which was emitted from a power station and which contained 1400 ppm of $SO_2$ was introduced into an absorbing tower 1 at a flow rate of 5000 $Nm^3$/hour and was contacted with a filtrate which was fed from the double decomposition reaction vessel 4 at a flow rate of 863 kg/hour and which contained 14% of $Na_2SO_3$ and 5% of $Na_2SO_4$, thereby absorbing 98% of $SO_2$. Furthermore, the filtrate was fed at a flow rate of 291 kg/hour to the wet type powdering machine 7 to which was also fed limestone having a particle size of 3 mm × 3 mm at a feeding rate of 32.2 kg/hour to obtain a limestone slurry having a concentration of 10% and a particle of 10 $\mu$. Then, 889 kg/hour of the aqueous solution containing 7.2% of $NaHSO_3$, 9.2% of $Na_2SO_3$ and 4.9% of $Na_2SO_4$ being obtained from the tower 1 and 322.2 kg/hour of the limestone slurry obtained from the wet type powdering machine were fed to the double decomposition powdering machine 4 for conducting the reaction in $NaHSO_3$ : $CaCO_3$ molar ratio 2 : 1.05 for a residence time of 2 hours. The resultant calcium sulfite was separated by means of the solid-liquid separator 5. The calcium sulfite, $CaSO_3$ · ½$H_2O$, had a purity of 96% and a particle size of 5 – 20 $\mu$. This revealed that almost 100% of $HaHSO_3$ was reacted with $CaCO_3$.

There was obtained a filtrate comprising an aqueous solution containing 14% of $Na_2SO_3$, 5% of $Na_2SO_4$ a trace of $NaHSO_3$ at a rate of 1154 Kg/hr. A major portion of the resultant filtrate was recirculated to the absorbing tower 1 at a rate of 863 Kg/hr. and the remainder was fed to the wet type powdering machine 7 to reduce the calcium carbonate to a small particle size. Such procedure was repeatedly and continuously effected.

On the other hand, the same procedure as mentioned above, except the wet-powdering, was effected by using commercial limestone having a particle size of 70 $\mu$.

The resultant calcium sulfite had a purity of about 72%. This revealed that the decomposing ratio of $NaHSO_3$ was less than 75%.

What is claimed is:

1. In a method for removing sulfur dioxide from a combustion exhaust gas in the form of calcium sulfite wherein said combustion exhaust gas is contacted with an aqueous alkali sulfite solution to form an aqueous alkali bisulfite solution, to which is then added calcium carbonate slurry to form calcium sulfite, and the calcium sulfite is separated from the reaction solution, the improvement comprising the calcium carbonate slurry is prepared by wet-powdering calcium carbonate in a particle size within a range of 0.1 – 30 $\mu$ by the use of a part of a filtrate of the reaction solution, and reusing the remaining part of the filtrate by recirculation as the aqueous alkali sulfite solution.

2. A method according to claim 1, wherein the calcium carbonate to be wet-powdered is selected from the group consisting of limestone, chalk, calcite aragonite, coral or shell, and has particle size within a range of 70 $\mu$ – 10 mm.

3. A method according to claim 1, wherein the particle size of said calcium carbonate is within a range of 0.1 – 20 $\mu$.

4. A method according to claim 1, wherein the pH value of said aqueous bisulfite alkali solution is within a range of 5.5 – 7.0.

5. A method according to claim 1, wherein said aqueous alkali sulfite solution has a concentration within a range of 10 – 25% by weight, and the reaction of sulfur dioxide and aqueous alkali sulfite solution is controlled in such a manner that said alkali bisulfite aqueous solution produced contains 3 – 15% by weight of the alkali bisulfite.

6. A method according to claim 1, wherein the pH value of the said filtrate is within a range of 6.5 – 8.5.

7. A method according to claim 1, wherein the concentrations of the alkali sulfite and the alkali bisulfite in the said filtrate are 10 – 25% and substantially 0 – 8%, respectively.

* * * * *